United States Statutory Invention Registration [19]

[11] Reg. Number: H118

Biggs et al. [45] Published: Sep. 2, 1986

[54] SYNTHESIZED SOUND TELEPHONE ALERTING MEANS

[75] Inventors: Ronald D. Biggs, Zionsville; Richard E. Waddell, Indianapolis; Kenneth B. Woodard, Noblesville, all of Ind.

[73] Assignee: AT&T Bell Laboratories, Murray Hill, N.J.

[21] Appl. No.: 659,847

[22] Filed: Oct. 11, 1984

[51] Int. Cl.[4] ..... H04M 1/21
[52] U.S. Cl. ..... 179/84 T; 179/84 R
[58] Field of Search ..... 179/81 R, 84 R, 84 T, 179/84 VF

[56] References Cited

U.S. PATENT DOCUMENTS 4,371,751 2/1983 Hilligass, Jr. et al. ..... 179/5 P X
4,480,153 10/1984 Festa ..... 179/84 T

OTHER PUBLICATIONS

Cousino, "IC Doorbell Plays Your Song", Radio Electronics, Sept. 1975, pp. 33-35, 104.

*Primary Examiner*—Stephen C. Buczinski
*Assistant Examiner*—Linda J. Wallace
*Attorney, Agent, or Firm*—Henry T. Brendzel

[57] ABSTRACT

A telephone with electronic telephone alerting circuitry which includes a telephone ringing detector, a sound synthesizer activated by the ringing detector and an amplifier-speaker arrangement responsive to the synthesizer. Whenever ringing is detected, the synthesizer is activated and caused to generate a specific signal sequence programmed into the synthesizer. The synthesized signal is amplified and applied to a transducer, such as a speaker, which produces the alerting sound. The synthesizer comprises a synthesis controlling processor and a memory for storing the parameters of the programmed signal sequence. The memory may be alterable or replaceable.

2 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SYNTHESIZED SOUND TELEPHONE ALERTING MEANS

TECHNICAL FIELD

This invention relates to telephone alerting means, and more particularly to alerting means of a telephone adapted for mounting decorative items thereon, where the alerting means provides synthesized sound or voice alerting associated with the mounted item.

BACKGROUND OF THE INVENTION

Telephone station set designs over the years have been primarily functional, with limited consideration given to their decorative aspects. More recently, however, a number of ornamental designs have become available to accommodate both the functional and decorative aspects that telephone users now demand. Numerous examples of novelty telephones are available, such as the MICKEY MOUSE, SNOOPY & WOODSTOCK, and WINNIE THE POOH phones, to name but a few. Undoubtedly additional characters will become popular, and the market for novelty telephones will grow. Such growth is not only a burden upon retailers who need to stock a full panoply of these telephones, but purchasers often tire of a telephone design long before its functional life is spent and thus obtain less than full value from their purchase.

In a copending application, Ser. No. 468,947, now abandoned, filed Feb. 23, 1983, a telephone stand was disclosed having a top surface suitable for mounting or supporting a decorative display. In an illustrative embodiment of the invention, the top surface of the telephone stand contains a recessed area for holding a decorative plate, which may support a figurine, a bust, a trophy, etc.

Thus, while attention has been paid to the decorative appearance of these telephones, the functionality has by and large remained unchanged from earlier telephones. These sets continue to use an electromechanical bell and clapper ringer or a piezoelectric sounder to alert the user that there is an incoming telephone call.

One manufacturer has announced an adjunct that is connected in series with a standard telephone and provides a repertoire of excerpts from popular tunes to perform the alerting function. While this provides the user with a different alerting signal, there is no symbiosis between the alerting signal and the set.

It is an object of this invention to enhance the personalization of a telephone having a mounted figurine, trophy or the like by including synthesized sound or voice alerting means that is associated with the mounted item.

SUMMARY OF THE INVENTION

This and other objects are realized with electronic telephone alerting means which include a telephone ringing detector, a sound synthesizer activated by the ringing detector and an amplifier-speaker arrangement responsive to the synthesizer. Whenever ringing is detected, the synthesizer is activated and caused to generate a specific signal sequence programmed into the synthesizer. The synthesized signal is amplified and applied to a transducer, such as a speaker, which produces the alerting sound. In one illustrative embodiment, the synthesizer comprises a synthesis controlling processor and a memory for storing the parameters of the programmed signal sequence. The memory may be alterable or replaceable.

BRIEF DESCRIPTION OF THE DRAWING

The FIGURE depicts one embodiment of a telephone having alerting means in accordance with the principles of our invention.

DETAILED DESCRIPTION

Figure 1:
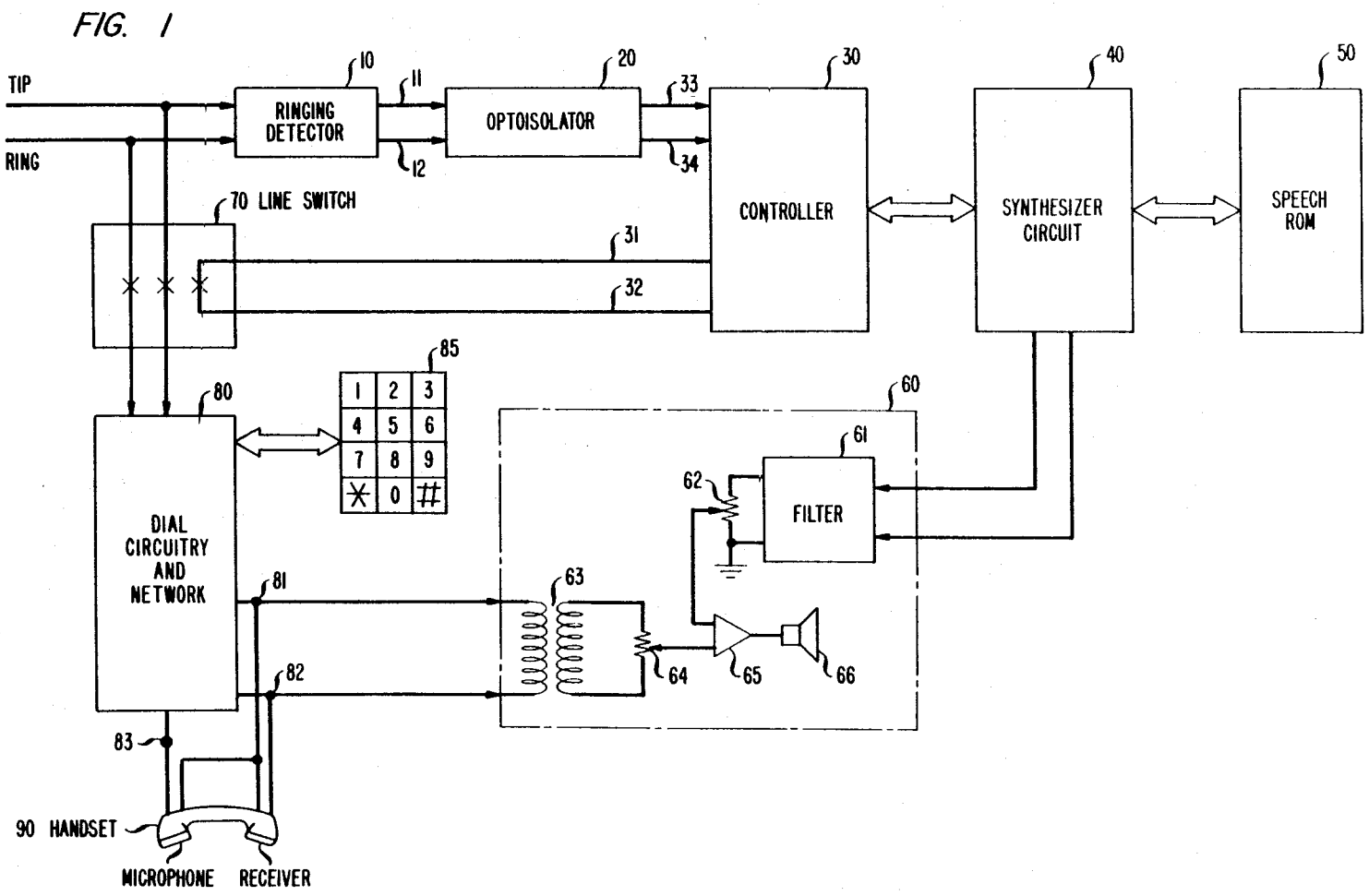

The FIGURE is a block diagram of a telephone which incorporates an electronic alerting means capable of synthesizing programmed alerting sounds. Elements 10 through 60 form the alerting portion of the telephone and elements 60 through 90 form the conventional signaling and communication portion of the telephone. Element 60 is common to both portions.

Line switch 70 is connected to the tip and ring leads of an incoming telephone line and its contacts are open when handset 90 is "on hook". When the telephone goes "off hook", the tip and ring leads are connected to dial circuitry and network, block 80, and terminals 31 and 32 of controller 30 are connected to each other.

Block 80 contains dial circuitry for generating telephone network address signals and a standard telephone network. The telephone network routes incoming signals to the receiver in handset 90 via terminals 81 and 82 and applies the handset's microphone signal to the tip and ring of the incoming telephone line via terminals 81 and 83 with appropriate side-tone to terminals 81 and 82. The dial circuitry may be of conventional touch-tone design, generating multi-frequency signals under control of dial pad 85. Alternately, although not shown, a rotary dial may be employed to generate telephone network address signals.

The communication portion is enhanced in the FIGURE embodiment with connection of terminals 81 and 82 to sounder 60. Within sounder 60, the signals across terminals 81 and 82 are fed to amplifier 65 via transformer 63 (for DC isolation) and volume control potentiometer 64, and the amplified signal is applied to speaker 66.

In the alerting portion of the FIGURE embodiment, ringing detector 10 is connected to the tip and ring leads of the incoming line and detects the ringing signals emanating from the central office. Detection is accomplished by sensing tip to ring ringing voltage and applying a voltage in response to such detection to opto-isolator 20. Detector 10 may be an integrated circuit composed of rectifiers, filters and voltage comparators or may simply be a relay with a coil not unlike the coil of a conventional telephone bell.

Opto-isolator 20, delivering its output signal to controller 30 via leads 33 and 34, serves to isolate the tip and ring lines from local ground in order to maintain line balance at the tip and ring. Controller 30, which monitors the alerting signals of isolator 20 and the "on hook/off hook" condition of line switch 70, provides control signals to synthesizer circuit 40. Controller 30 can be quite simple. To provide versatility, however, we chose a National Semiconductor COP-410L Signal-Chip Microcontroller to serve as controller 30 which, under program control, monitors terminal pairs 31–32 and 33–34, and controls the sound synthesis of various speech sequences. We choose to synthesize four different alerting messages and to sequence through the messages with each ringing cycle. When ringing ceases (because the call is either answered or abandoned) the controller stores the last message number and begins the next ringing sequence with that message. Of course, controller 30 can be adopted to sequence through the messages differently or in response to manual activation.

Synthesizer circuit 40 (National Semiconductor integrated circuit DT1050, for example), in communication with read only memory 50 and under control of controller 30, develops the synthesized sounds.

Although speech synthesis is a relatively new art there is a substantial body of literature that describes the various approaches to speech synthesis. In fact, in connection with the offering of the DT1050 and related speech synthesis circuits, National Semiconductor has published an Application Note AN252 which describes the synthesis technique that builds on speech phonemes. The Note also describes the specific method employed of sampling the waveform of the specific sound that is desired to be synthesized, digitizing the sampled waveform, compressing the information by eliminating superfluous information by adaptive delta modulation and storing the reduced set of samples in memory. In the embodiment shown in the FIGURE, memory 50 stores the parameters (phonemes) of the particular speech or sound pattern desired, and circuit 40 combines those parameters to form the sounds. Those wishing to implement the specific embodiment of the FIGURE will want to follow the teachings of Application Note AN252. The audio alerting signal emanating from synthesizer circuit 40 is applied, in the FIGURE embodiment, to sounder 60 wherein it is filtered with low pass filter 61 and applied to amplifiers 65 via potentiometer

62. The output of amplifier 65 is applied to loudspeaker 66 to produce the alerting sound. Advantageously, memory 50 may be arranged in the form of a removable cartridge, permitting the telephone user to modify the alerting speech or sound.

What is claimed is:

1. A telephone including tip and ring input leads comprising:

a hook switch connected to said tip and ring leads and responsive to user controlled status of said telephone;

a ringing detector, connected to said tip and ring leads, for recognizing hailing signals on said tip and ring leads;

controller means responsive to said ringing detector and to said hook switch;

a read-only-memory for storing a preselected audio message;

a synthesizer, responsive to said read-only-memory and to said controller for developing an audio signal representative of said audio message; and means for converting said audio signal to sound.

2. The telephone of claim 1 wherein said controller includes an optoisolator connected to said ringing detector followed by an integrated circuit for initiating operation of said synthesizer in response to a detected hailing signal and for terminating operation of said synthesizer in response to an off hook status indication by said hook switch.

* * * * *